(12) United States Patent
Shipley et al.

(10) Patent No.: US 10,994,319 B2
(45) Date of Patent: May 4, 2021

(54) BIMETALLIC TUBE AND METHOD FOR MANUFACTURING A BIMETALLIC TUBE

(71) Applicant: Sandvik Intellectual Property AB, Sandviken (SE)

(72) Inventors: James Shipley, Sandviken (SE); Daniel Gullberg, Gävle (SE); Robert Mattsson, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 319 days.

(21) Appl. No.: 16/313,240

(22) PCT Filed: Jun. 30, 2017

(86) PCT No.: PCT/EP2017/066254
§ 371 (c)(1),
(2) Date: Dec. 26, 2018

(87) PCT Pub. No.: WO2018/002295
PCT Pub. Date: Jan. 4, 2018

(65) Prior Publication Data
US 2019/0168274 A1 Jun. 6, 2019

(30) Foreign Application Priority Data

Jul. 1, 2016 (EP) .................................... 16177637

(51) Int. Cl.
*B21C 37/15* (2006.01)
*B32B 15/01* (2006.01)
(Continued)

(52) U.S. Cl.
CPC .............. *B21C 37/154* (2013.01); *B21C 1/00* (2013.01); *B32B 15/013* (2013.01); *C22C 16/00* (2013.01);
(Continued)

(58) Field of Classification Search
None
See application file for complete search history.

(56) References Cited

FOREIGN PATENT DOCUMENTS

| DE | 1146832 B | 4/1963 |
| GB | 1137310 A | 12/1968 |

(Continued)

OTHER PUBLICATIONS

International Search Report and Written Opinion dated Aug. 11, 2017, issued in corresponding International Patent Application No. PCT/EP2017/066254.
(Continued)

*Primary Examiner* — Adam Krupicka
(74) *Attorney, Agent, or Firm* — Morgan, Lewis & Bockius LLP

(57) ABSTRACT

The present disclosure relates to a bimetallic tube comprising a first metallic tube having an inner diameter and an outer diameter, and a second metallic tube having an inner diameter and an outer diameter, wherein the first metallic tube is arranged within and force-fitted to the second metallic tube and wherein the first metallic tube comprises a zirconium (Zr) based alloy and wherein the second metallic tube comprises an austenitic stainless steel. The present disclosure also relates to a method for manufacturing a bimetallic tube comprising the steps of providing a first metallic tube having an inner diameter and an outer diameter, providing a second metallic tube having an inner diameter and an outer diameter, wherein the outer diameter of the first metallic tube is smaller than the inner diameter of the second tube, insetting the first metallic tube into the second metallic tube, cold-drawing the first and second metallic tubes together, such that the first and second metallic tubes are force-fitted together.

19 Claims, 1 Drawing Sheet

(51) Int. Cl.
 *C22C 16/00* (2006.01)
 *B21C 1/00* (2006.01)
 *C22C 38/00* (2006.01)
 *C22C 38/02* (2006.01)
 *C22C 38/04* (2006.01)
 *C22C 38/08* (2006.01)
 *C22C 38/12* (2006.01)
 *C22C 38/44* (2006.01)
 *C22C 38/58* (2006.01)
 *C22C 38/40* (2006.01)

(52) U.S. Cl.
 CPC ............ *C22C 38/001* (2013.01); *C22C 38/02* (2013.01); *C22C 38/04* (2013.01); *C22C 38/08* (2013.01); *C22C 38/12* (2013.01); *C22C 38/40* (2013.01); *C22C 38/44* (2013.01); *C22C 38/58* (2013.01)

(56) References Cited

FOREIGN PATENT DOCUMENTS

| | | |
|---|---|---|
| GB | 1225896 A | 3/1971 |
| JP | H02-121784 A | 5/1990 |
| WO | 2014/169366 A2 | 10/2014 |

OTHER PUBLICATIONS

Extended European Search Report dated Dec. 12, 2016, issue in corresponding European Patent Application No. EP 16177637.2.

BIMETALLIC TUBE AND METHOD FOR MANUFACTURING A BIMETALLIC TUBE

TECHNICAL FIELD

The present disclosure relates to a bimetallic tube comprising a first metallic tube having an inner diameter and an outer diameter, and a second metallic tube having an inner diameter and an outer diameter, wherein the first metallic tube is arranged within and force-fitted to the second metallic tube and wherein the first metallic tube comprises a zirconium (Zr) based alloy and wherein the second metallic tube comprises an austenitic stainless steel. The present disclosure also relates to a method for manufacturing a bimetallic tube comprising the steps of providing a first metallic tube having an inner diameter and an outer diameter, providing a second metallic tube having an inner diameter and an outer diameter, wherein the outer diameter of the first metallic tube is smaller than the inner diameter of the second tube, inserting the first metallic tube into the second metallic tube, cold-drawing the first and second metallic tubes together, such that the first and second metallic tubes are force-fitted together.

SUMMARY

It is an aspect of the present disclosure to provide a bimetallic tube which will be corrosion resistant, and will facilitate the design and manufacture of industrial plants and equipment, such as heat exchangers. Further, the cost of manufacture of industrial plants and equipment will also be reduced by using the present bimetallic tube. Additionally, the present disclosure also provides a method for manufacture of such a bimetallic tube, which method will provide bimetallic tubes having strong mechanical bonds.

Hence, at least one aspect underlying the present disclosure is solved by a bimetallic tube comprising a first metallic tube having an inner diameter and an outer diameter, and a second metallic tube having an inner diameter and an outer diameter, wherein the first metallic tube is arranged within and force-fitted to the second metallic tube and wherein the first metallic tube comprises, in weight % (wt-%), Fe+Cr≤1.0; C≤0.1; O≤0.2; Hf≤5.0; balance Zr and normally occurring impurities, and wherein the second metallic tube is an austenitic stainless steel comprising, in weight % (wt-%), C≤0.04; Mn≤3.0; P≤0.05; S≤0.04; Si≤1.0; Cr 15.0-30.0; Ni 7.0-25.0; Mo≤1.0; N≤0.10; balance Fe and normally occurring impurities, and wherein the force-fitting of the first metallic tube to the second metallic tube is at least 20 µm determined by the following procedure:
  measuring the inner diameter ($ID_{BM}$) of the bimetallic tube;
  removing the second metallic tube from the first metallic tube;
  measuring the inner diameter ($ID_{1st}$) of the first metallic tube after the second metallic tube has been removed;
  calculating the absolute value of the difference ($ID_{BM}$-$ID_{1st}$) between the inner diameter ($ID_{BM}$) of the bimetallic tube and the inner diameter ($ID_{1st}$) of the first metallic tube after the second metallic tube has been removed.

In terms of the present disclosure, if not excluded explicitly or technically impossible, the wording "smaller or equal" or the sign "≤", respectively, refer to an upper limit, wherein it is apparent for a person skilled in the art that the lower limit is zero, such there is no significant amount of the component exceeding the amount of normally occurring impurities. Accordingly the respective component is optional, but in case the component is present it does not exceed the maximum, i.e. upper limit.

Combining a zirconium based alloy inner tube, i.e. the first metallic tube, having a composition as outlined above, and an austenitic stainless steel tube, i.e. the second metallic tube, having a composition as outlined above is surprisingly beneficial to obtain a bimetallic tube which will have high resistance against corrosion and also be mechanically stable.

Since zirconium is a highly reactive element, it is very difficult to achieve a metallurgical bonding between a zirconium based alloy inner tube and an outer tube made from an austenitic stainless steel. Thus, when combing the inner tube and the outer tube for forming a bimetallic tube according to the present disclosure the inner and outer tubes are mechanically bonded to each other, i.e. force-fitted together.

According to the present disclosure, one important parameter for determining the degree of force-fitting between the first metallic tube (the inner tube) and the second metallic tube (the outer tube), so that it is sufficient is to use a procedure wherein the inner diameter of the obtained bimetallic tube, i.e. the inner diameter of the inner tube in a state when it is force-fitted to the second metallic tube, is measured and compared with the inner diameter of the first tube after the second metallic tube has been removed from the first metallic tube. It should be noted that it is not necessary to use a whole tube for the procedure, a sample removed from the bimetallic tube comprising both the first and second tubes is sufficient for the procedure.

One of the underlying concepts of the present disclosure is the finding of how a bond is achieved between the first and second metallic tube. Surprisingly, it has been found that by having a greater elastic spring back for the first metallic tube compared with the second metallic tube, a strong mechanical lock (bond) between the first and second metallic tubes is provided.

Hence, the present inventors have found that surprisingly a strong mechanical lock (i.e. a mechanical bond) can be achieved by manufacturing a bimetallic tube by cold deformation. Without being bound to any theory, this is believed to depend on the plastic deformation which will occur during the deformation of the tubes and that a mechanical bond will be formed between the tubes when both the first and the second tubes have been plastically deformed.

Hence, by means of the present disclosure, an adequate force-fitting between the first metallic tube and the second metallic tube is achieved when the force-fitting of first metallic tube to the second metallic tube is at least 20 µm, which value is determined by the following procedure:
  measuring the inner diameter ($ID_{BM}$) of the bimetallic tube;
  removing the second metallic tube from the first metallic tube;
  measuring the inner diameter ($ID_{1st}$) of the first metallic tube after the second metallic tube has been removed;
  calculating the absolute value of the difference ($ID_{BM}$-$ID_{1st}$) between the inner diameter ($ID_{BM}$) of the bimetallic tube and the inner diameter ($ID_{1st}$) of the first metallic tube after the second metallic tube has been removed.

The procedure is a test for determining the degree of force-fitting between the first metallic tube and the second metallic tube, i.e. the strength of the mechanical bond. The procedure is the following:
  measuring the inner diameter ($ID_{BM}$) of the bimetallic tube;

removing the second metallic tube from the first metallic tube; measuring the inner diameter ($ID_{1st}$) of the first metallic tube after the second metallic tube has been removed;

calculating the absolute value of the difference ($ID_{BM}$-$ID_{1st}$) between the inner diameter ($ID_{BM}$) of the bimetallic tube and the inner diameter ($ID_{1st}$) of the first metallic tube after the second metallic tube has been removed, in case the parameters for the force-fitting have been chosen so to comply with the teaching of the present disclosure the obtained value should be at least 20 µm.

The second metallic tube in an embodiment may be removed by milling or by pressing the first metallic tube out of the second metallic tube.

As obvious for the skilled person, depending on the size of the tube, a whole bimetallic tube may be used for the procedure or a sample may be removed from the bimetallic tube and used for the procedure. Additionally, the inner diameter of the first metallic tube and/or the bimetallic tube may also be the average inner diameter obtained by measuring the inner diameter at several locations, e.g. at three different locations. Thus, the absolute value obtained by the present procedure is the bond strength (i.e. the contact pressure) between the inner and outer metallic tubes.

The austenitic stainless steel comprises, in weight % (wt-%),
C≤0.04;
Mn≤3.0;
P≤0.05;
S≤0.04;
Si≤1.0;
Cr 15.0-30.0;
Ni 7.0-25.0;
Mo≤1.0;
N≤0.10;
balance Fe and normally occurring impurities.

The amount of chromium contained in the second metallic tube will improve its resistance against most types of corrosion. In order to attain adequate corrosion resistance the amount of Cr present in the second metallic tube in an embodiment should be in a range of, in weight % (wt-%), 17 to 21 or, in weight % (wt-%), 18 to 20. In another embodiment, Cr is present in the second metallic tube in a range of in, weight % (wt-%), 23 to 27 or in weight % (wt-%), 24 to 26.

In a further embodiment, the second metallic tube is selected from a first composition comprising, in weight % (wt-%), C≤0.035; Si≤0.4, Mn≤2.0; P≤0.045; S≤0.03; Cr 18.0-20.0; Ni 8.5-12.0; balance Fe and normally occurring impurities, or a second composition comprising in weight % (wt-%), C≤0.02; Si≤0.15; Mn≤2.0; P≤0.02; S≤0.015; Cr 24.0-26.0; Ni 19.0-22.0; N≤0.1; balance Fe and normally occurring impurities. In particular, a second metallic tube of the second composition has an excellent resistance to corrosion in nitric acid, an excellent resistance to intergranular corrosion, a good resistance to pitting, and a good weldability.

At least one aspect underlying the present disclosure is also solved by a method for manufacturing a bimetallic tube comprising the steps of providing a first metallic tube having an inner diameter and an outer diameter, providing a second metallic tube having an inner diameter and an outer diameter, wherein the outer diameter of the first metallic tube is smaller than the inner diameter of the second tube, inserting the first metallic tube into the second metallic tube, cold-drawing the first and second metallic tubes together, such that the first and second metallic tubes are force-fitted together, wherein in the step of providing the first metallic tube, the first metallic tube comprises, in weight % (wt-%), Fe+Cr≤1.0; C≤0.1; O≤0.2; Hf≤5.0; balance Zr and normally occurring impurities, wherein in the step of providing the second metallic tube, the second metallic tube is an austenitic stainless steel comprising, in weight % (wt-%), C≤0.04; Mn≤3.0; P≤0.05; S≤0.04; Si≤1.0; Cr 15.0-30.0; Ni 7.0-25.0; Mo≤1.0; N≤0.10; balance Fe, and normally occurring impurities, wherein after the step of cold-drawing, in case the parameters for the force-fitting have been chosen so to comply with the teaching of the present disclosure, the force-fitting of the first metallic tube to the second metallic tube is at least 20 µm determined by the following procedure:

measuring the inner diameter ($ID_{BM}$) of the bimetallic tube;

removing the second metallic tube from the first metallic tube;

measuring the inner diameter ($ID_{1st}$) of the first metallic tube after the second metallic tube has been removed;

calculating the absolute value of the difference ($ID_{BM}$-$ID_{1st}$) between the inner diameter ($ID_{BM}$) of the bimetallic tube and the inner diameter ($ID_{1st}$) of the first metallic tube after the second metallic tube has been removed.

According to the present disclosure the bimetallic tube is manufactured by providing a first metallic tube with an inner diameter and an outer diameter, and by providing a second metallic tube with an inner diameter and an outer diameter. The outer diameter of the first metallic tube is smaller than the inner diameter of the second metallic tube.

After providing the first metallic tube and the second metallic tube, the first metallic tube is inserted into the second metallic tube. Afterwards the first metallic tube and the second metallic tube are mechanically bonded to each other, i.e. force-fitted by cold-drawing the first and second metallic tubes together.

By drawing the first metallic tube and the second metallic tube together through a drawing die, which has a diameter defining the outer diameter of the second metallic tube after drawing, the first metallic tube and the second metallic tube are force-fitted together so to form the bimetallic tube. In order to obtain a force-fitting between the first metallic tube and the second metallic tube, the diameter of the drawing die has to be smaller than the outer diameter of the second metallic tube. During the forming in the drawing die, the second metallic tube is plastically deformed, whereby the inner diameter of the second metallic tube is reduced, the first metallic tube is also plastically deformed and a force-fitting is obtained between the first and second metallic tubes.

Accordingly, the outer diameter and the inner diameter of the second metallic tube before the cold-drawing step, the outer diameter and the inner diameter of the first metallic tube before the cold-drawing step, as well as the dimensions of the drawing die have to be adjusted in order to achieve the desired force-fitting.

In order to obtain a bimetallic tube according to the present disclosure in the step of providing the first metallic tube, the first metallic tube comprises, in weight % (wt-%), Fe+Cr≤1.0; C≤0.1; O≤0.2; Hf≤5.0; balance Zr, and normally occurring impurities, wherein in the step of providing the second metallic tube, the second metallic tube is an austenitic stainless steel comprising, in weight % (wt-%), C≤0.04; Mn≤3.0; P≤0.05; S≤0.04; Si≤1.0; Cr 15.0-30.0; Ni 7.0-25.0; Mo≤1.0; N≤0.10, balance Fe and normally occurring impurities. By doing so a bimetallic tube which is at the same time highly resistant against corrosion and mechanically stable is obtained.

However, in order to obtain an adequate mechanical bonding between the first metallic tube and the second metallic tube, the parameter of the cold-drawing step are chosen, such that after the step of cold-drawing the force-fitting of the first metallic tube to the second metallic tube is at least 20 µm determined by the following procedure:

measuring the inner diameter ($ID_{BM}$) of the bimetallic tube;

removing the second metallic tube from the first metallic tube;

measuring the inner diameter ($IM_{1st}$) of the first metallic tube after the second metallic tube has been removed;

calculating the absolute value of the difference ($ID_{BM}$-$ID_{1st}$) between the inner diameter ($ID_{BM}$) of the bimetallic tube and the inner diameter ($ID_{1st}$) of the first metallic tube after the second metallic tube has been removed.

As outlined above at least one benefit thereof is that the force between the first metallic tube and the second metallic tube is sufficiently high to obtain a strong and long-lasting bonding.

The upper limit of the degree of cold deformation is set depending on the demands regarding elongation and hardness. Thus, in one embodiment, in the step of cold drawing, the outer diameter of the second tube is reduced 10% or less compared to outer diameter of the second metallic tube before cold-drawing when the content of Cr present in the second metallic tube is in a range of from 17 to 21 weight % (wt-%), such as 18 to 20 weight % (wt-%). In a further embodiment, in the step of cold-drawing, the outer diameter of the second tube is reduced 4% or less compared to outer diameter of the second metallic tube before cold-drawing when the content of Cr present in the second metallic tube is in a range of from 23 to 27 weight % (wt-%), such as 24 to 26 weight % (wt %).

In yet another embodiment after the step of cold-drawing, the second metallic tube has an elongation of at least or equal to 35% and a hardness of less than or equal to 90 HRB.

In an embodiment in the steps of providing first and second metallic tubes the first metallic tube and/or the second metallic tube is heat-treated before the step of inserting the first metallic tube into the second metallic tube, for example the first and second metallic tubes may have been annealed and/or bright annealed.

In a further embodiment in the steps of providing first and second metallic tubes, the first metallic tube and/or the second metallic tube are cold worked tubes, such as cold-drawn or pilgered tubes.

In another embodiment in the step of providing the first metallic tube, the first metallic tube is a seamless tube.

According to a further embodiment in the step of providing the first metallic tube, the average wall thickness of the first metallic tube is 0.3 mm to 2 mm. For instance, the average wall thickness of the first metallic tube can be 0.7 mm.

In a further embodiment in the step of providing the second metallic tube, the second metallic tube is a seamless tube.

In another embodiment in the step of providing the second metallic tube, the average wall thickness of the second metallic tube is 0.5 mm to 4 mm. For instance, the average wall thickness of the second metallic tube can be 1.6 mm.

Hence, an advantage with this solution is that normal stainless steel tube sheets can be used nonetheless the corrosion resistance is enhanced since zirconium is used as an inner tube liner. The zirconium tube is a corrosion barrier and protects the tube from corrosion.

Further advantages, features and applications of the present disclosure will become apparent from the following description of embodiments and the corresponding figures attached. The foregoing as well as the following detailed description of the embodiments will be better understood when read in conjunction with the appended drawings. It should be understood that the embodiments depicted are not limited to the precise arrangements and instrumentalities shown.

Insofar as in the foregoing as well as the following detailed description of the embodiments and claims reference is made to either the bimetallic tube or the method for manufacturing a bimetallic tube, the features described are applicable for both the bimetallic tube and the method for manufacturing the bimetallic tube.

DETAILED DESCRIPTION

Figure 1A:
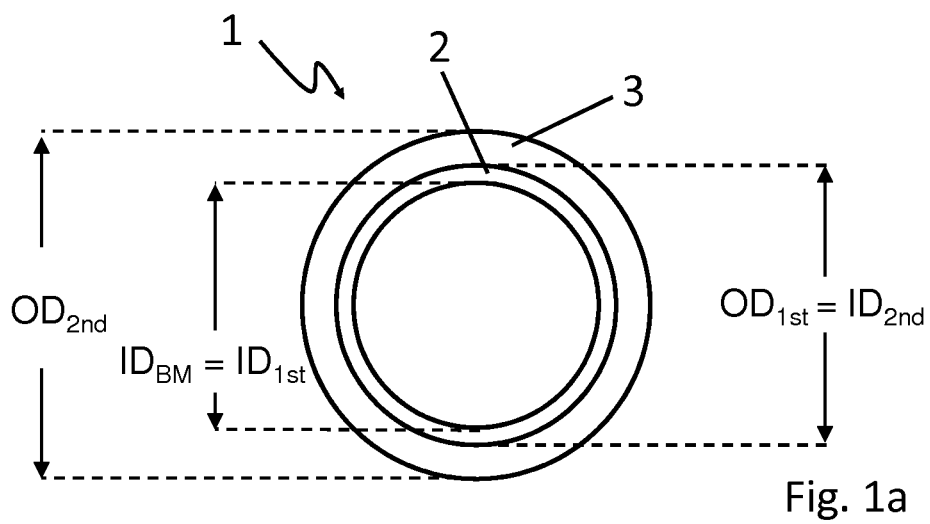
FIG. 1a is schematic cross-section of a bimetallic tube according to an embodiment of the present disclosure.

The bimetallic tube 1 according to an embodiment of the present disclosure as depicted in FIG. 1a comprises a first metallic tube 2 and a second metallic tube 3. The first metallic tube 2 comprises, in weight % (wt-%), Fe+Cr≤1.0; C≤0.1; O≤0.2; Hf≤5.0; balance Zr and normally occurring impurities. The second metallic tube is an austenitic stainless steel comprising, in weight % (wt-%), C≤0.04; Mn≤3.0; P≤0.05; S≤0.04; Si≤1.0; Cr 15.0-30.0; Ni 7.0-25.0; Mo≤1.0; N≤0.10; balance Fe, and normally occurring impurities.

Each of the first metallic tube 2 and the second metallic tube 3 comprises an inner diameter $ID_{1st}$ or $ID_{2nd}$, respectively, and an outer diameter $OD_{1st}$ or $OD_{2nd}$, respectively. Before cold-drawn together, the outer diameter $OD_{1st}$ of the first metallic tube 2 is slightly smaller than the inner diameter $ID_{2nd}$ of the second metallic tube 3, such that the first metallic tube 2 can be easily inserted into the second metallic tube 3.

Afterwards, i.e. after the first metallic tube 2 has been inserted into the second metallic tube 3, the first metallic tube 2 and the second metallic tube 3 are cold-drawn together through a drawing die. During the cold-drawing step, a force is applied to both the second metallic tube 3 and the first metallic tube 2 inserted therein yielding a plastic deformation and a reduction of the inner diameter $ID_{2nd}$ of the second metallic tube 3 and of the outer diameter $OD_{1st}$ of the first metallic tube 2. In a state after cold-drawing, as it is depicted in FIG. 1a, the outer diameter $OD_{1st}$ of the first metallic tube 2 equals the inner diameter $ID_{2nd}$ of the second metallic tube 3. Further, in a state after cold-drawing, as it is depicted in FIG. 1a, the inner diameter $ID_{BM}$ of the bimetallic tube equals the inner diameter $ID_{1st}$ of the first metallic tube 2.

The deformation of the first and second metallic tubes 2, 3 obtained during cold-drawing depends on size of the outer diameter $OD_{1st}$ of the first metallic tube, the inner diameter $ID_{2nd}$ and the outer diameter $OD_{2nd}$ of the second metallic tube and the inner dimension of the drawing die. The parameters applied in the cold-drawing step are chosen, such that the force-fitting of the first metallic tube 2 to the second metallic tube 3 is at least 20 μm.

The force-fitting is determined by the following procedure: The inner diameter ($ID_{BM}$) of the bimetallic tube (1) is measured; the second metallic tube (3) is removed from the first metallic tube (2); the inner diameter ($ID_{1st}$) of the first metallic tube (2) is measured after removing the second metallic tube (3); the absolute value of the difference $ID_{BM}$–$ID_{1st}$ between the inner diameter $ID_{BM}$ of the bimetallic tube 1 and the inner diameter $ID_{1st}$ of the first metallic tube 2 after the second metallic tube 3 has been removed is calculated.

Figure 1B:
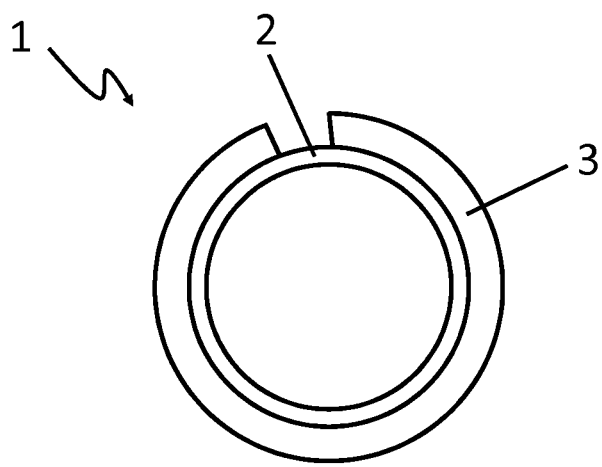
FIG. 1b is a schematic cross-section of a bimetallic tube according to an embodiment of the present disclosure indicating the removal of the second metallic tube.

The removal of the second metallic tube 3 from the first metallic tube 2 is indicated in FIG. 1b. FIG. 1b is a cross-section of the bimetallic tube 1 according to the embodiment of FIG. 1a. Although in the present embodiment the second metallic tube 3 is removed by milling off the second metallic tube 3, the second metallic tube 3 could also be removed by pressing the first metallic tube 2 out of the second metallic tube 3. It is to be understood that a whole tube does not have to be used in the procedure, a sample of the bimetallic tube 1 is sufficient for obtaining the values of force-fitting.

Figure 1C:
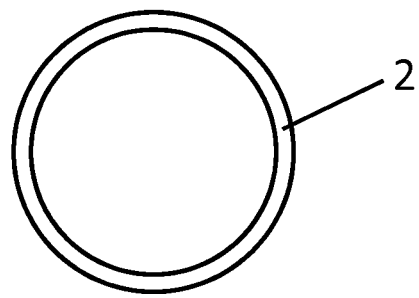
FIG. 1c is a schematic cross-section of the bimetallic tube according to FIG. 1b with the first metallic tube left after removal of the second metallic tube.

After the second metallic tube 3 has been completely removed from the first metallic tube 2, as it is depicted in FIG. 1c, the first metallic tube 2 expands again and the inner diameter $ID_{1st}$ of the first metallic tube 2 is measured. The outer diameter $OD_{1st}$ and the inner diameter $ID_{1st}$ of the first metallic tube 2 is larger than in the cold-drawn state shown in FIG. 1a.

The absolute value of the difference $ID_{BM}$–$ID_{1st}$ between the inner diameter $ID_{BM}$ of the bimetallic tube 1 and the inner diameter $ID_{1st}$ of the first metallic tube 2 after the second metallic tube 3 has been removed is calculated. By means of the present disclosure, the deformation applied in the cold-drawing step is sufficiently high when the value is at least 20 μm.

For purposes of original disclosure, it is pointed out that all features which are apparent for a person skilled in the art from the present description, the figures and the claims, even if they have only been described with further features, could be combined on their own or together with all the combinations of the features disclosed herein, if not excluded explicitly or technically impossible. A comprehensive explicit description of all possible combinations of features is only omitted in order to provide readability of the description.

While the disclosure has been described with respect to a limited number of embodiments, it will be understood that the disclosure of which is not limited to those embodiments. Other embodiments comprising various changes do not depart from the scope of the disclosure. In particular, the description of preferred embodiments shall not be understood to be limited to what is explicitly shown and described in the specification and drawings but shall encompasses the disclosure of the specification and drawings as a whole.

The invention claimed is:

1. A bimetallic tube comprising a first metallic tube having an inner diameter ($ID_{1st}$) and an outer diameter ($OD_{1st}$), and a second metallic tube having an inner diameter ($ID_{2nd}$) and an outer diameter ($OD_{2nd}$),
   wherein the first metallic tube is arranged within and force-fitted to the second metallic tube, wherein the first metallic tube comprises, in weight %,
   Fe+Cr≤1.0;
   C≤0.1;
   O≤0.2;
   Hf≤5.0;
   balance Zr and normally occurring impurities,
   wherein the second metallic tube is an austenitic stainless steel comprising, in weight,
   C≤0.04;
   Mn≤3.0;
   P≤0.05;
   S≤0.04;
   Si≤1.0;
   Cr 15.0-30.0;
   Ni 7.0-25.0;
   Mo≤1.0;
   N≤0.10;
   balance Fe and normally occurring impurities,
   and wherein the force-fitting of the first metallic tube to the second metallic tube is at least 20 μm determined by the following procedure:
   measuring the inner diameter ($ID_{BM}$) of the bimetallic tube;
   removing the second metallic tube from the first metallic tube;
   measuring the inner diameter ($ID_{1st}$) of the first metallic tube after the second metallic tube has been removed; and
   calculating the absolute value of the difference ($ID_{BM}$–$ID_{1st}$) between the inner diameter ($ID_{BM}$) of the bimetallic tube and the inner diameter ($ID_{1st}$) of the first metallic tube after the second metallic tube has been removed.

2. The bimetallic tube according to claim 1, wherein the content of Cr present in the second metallic tube is in a range of from 17 to 21 weight %.

3. The bimetallic tube according to claim 1, wherein the content of Cr present in the second metallic tube is in a range of from 23 to 27 weight %.

4. A method for manufacturing a bimetallic tube comprising the steps of:
   providing a first metallic tube having an inner diameter ($ID_{1st}$) and an outer diameter ($OD_{1st}$), and providing a second metallic tube having an inner diameter ($ID_{2nd}$) and an outer diameter ($OD_{2nd}$), wherein the outer diameter ($OD_{1st}$) of the first metallic tube is smaller than the inner diameter ($ID_{2nd}$) of the second tube;
   inserting the first metallic tube into the second metallic tube; and
   cold-drawing the first and second metallic tubes together, such that the first and second metallic tubes are force-fitted together,
   wherein in the step of providing the first metallic tube, the first metallic tube comprises, in weight %;
   Fe+Cr≤1.0;
   C≤0.1;
   O≤0.2;
   Hf≤5.0;
   balance Zr and normally occurring impurities,
   wherein in the step of providing the second metallic tube, the second metallic tube is an austenitic stainless steel comprising, in weight %;
   C≤0.04;
   Mn≤3.0;
   P≤0.05;
   S≤0.04;
   Si≤1.0;
   Cr 15.0-30.0;
   Ni 7.0-25.0;

Mo≤1.0;

N≤0.10;

balance Fe and normally occurring impurities, and wherein after the step of cold-drawing the first metallic tube is force-fitted to the second metallic tube so that the spring back is least 20 μm determined by the following procedure:

measuring the inner diameter ($ID_{BM}$) of the bimetallic tube;

removing the second metallic tube from the first metallic tube;

measuring the inner diameter ($ID_{1st}$) of the first metallic tube after the second metallic tube has been removed; and calculating the absolute value of the difference ($ID_{BM}$-$ID_{1st}$) between the inner diameter ($ID_{BM}$) of the bimetallic tube and the inner diameter ($ID_{1st}$) of the first metallic tube after the second metallic tube has been removed.

5. The bimetallic tube according to claim 4, wherein the content of Cr present in the second metallic tube is in a range of from 17 to 21 weight %.

6. The bimetallic tube according to claim 4, wherein the content of Cr present in the second metallic tube is in a range of from 23 to 27 weight %.

7. The method according to claim 4, wherein in the step of cold-drawing, the outer diameter ($OD_{2nd}$) of the second tube is reduced 10% or less compared to outer diameter ($OD_{2nd}$) of the second metallic tube before cold-drawing.

8. The method according to claim 4, wherein in the step of cold-drawing, the outer diameter ($OD_{2nd}$) of the second tube is reduced 4% or less compared to outer diameter ($OD_{2nd}$) of the second metallic tube before cold-drawing.

9. The method according to claim 4, wherein after the step of cold-drawing the second metallic tube has an elongation of at least or equal to 35% and a hardness not more than or equal to 90 HRB.

10. The method according to claim 4, wherein in the step of providing the first metallic tube and/or the second metallic tube is heat-treated before the step of inserting the first metallic tube into the second metallic tube.

11. The method according to claim 4, wherein in the steps of providing first and second metallic tubes, the first metallic tube and/or the second metallic tube are cold worked tubes.

12. The method according to claim 4, wherein in the step of providing the first metallic tube, the first metallic tube is a seamless tube.

13. The method according to claim 4, wherein in the step of providing the first metallic tube, the average wall thickness of the first metallic tube is 0.3 mm to 2 mm.

14. The method according to claim 4, wherein in the step of providing the second metallic tube, the second metallic tube is a seamless tube.

15. The method according to claim 4, wherein in the step of providing the second metallic tube, the average wall thickness of the second metallic tube is 0.5 mm to 4 mm.

16. The bimetallic tube according to claim 2, wherein the content of Cr present in the second metallic tube is in a range of from 18 to 20 weight %.

17. The bimetallic tube according to claim 3, wherein the content of Cr present in the second metallic tube is in a range of from 24 to 26 weight %.

18. The bimetallic tube according to claim 5, wherein the content of Cr present in the second metallic tube is in a range of from 18 to 20 weight %.

19. The bimetallic tube according to claim 6, wherein the content of Cr present in the second metallic tube is in a range of from 24 to 26 weight %.

\* \* \* \* \*